United States Patent
Daido et al.

(10) Patent No.: US 6,818,352 B2
(45) Date of Patent: Nov. 16, 2004

(54) LITHIUM SECONDARY CELL, SEPARATOR, CELL PACK, AND CHARGING METHOD

(75) Inventors: Takahiro Daido, Iwakuni (JP); Satoshi Igarashi, Iwakuni (JP); Satoshi Nishikawa, Iwakuni (JP); Hiroyuki Honmoto, Iwakuni (JP); Hiroyoshi Minematsu, Iwakuni (JP)

(73) Assignee: Teijin Limited, Osaka (JP)

( * ) Notice: Subject to any disclaimer, the term of this patent is extended or adjusted under 35 U.S.C. 154(b) by 218 days.

(21) Appl. No.: 09/959,538

(22) PCT Filed: Mar. 7, 2001

(86) PCT No.: PCT/JP01/01785

§ 371 (c)(1),
(2), (4) Date: Oct. 29, 2001

(87) PCT Pub. No.: WO01/67536

PCT Pub. Date: Sep. 13, 2001

(65) Prior Publication Data

US 2003/0003363 A1 Jan. 2, 2003

(30) Foreign Application Priority Data

Mar. 7, 1999 (JP) ........................................ 2000-061674
Apr. 27, 2000 (JP) ........................................ 2000-127309
Oct. 24, 2000 (JP) ........................................ 2000-323795

(51) Int. Cl.$^7$ ........................ H01M 10/44; H01M 10/42
(52) U.S. Cl. ................................... 429/231.95; 429/60
(58) Field of Search ..................... 429/60, 248, 231.1, 429/231.95

(56) References Cited

U.S. PATENT DOCUMENTS

| | | | |
|---|---|---|---|
| 3,174,879 A | * | 3/1965 | Stanimirovitch ............. 429/60 |
| 3,953,241 A | | 4/1976 | Langer et al. ............... 429/142 |
| 5,362,582 A | | 11/1994 | Chang et al. ............... 429/249 |
| 5,665,265 A | | 9/1997 | Gies et al. |
| 5,708,351 A | | 1/1998 | Takamoro |
| 5,721,067 A | * | 2/1998 | Jacobs et al. ................. 429/60 |
| 5,834,135 A | | 11/1998 | Pendalwar et al. |
| 6,096,453 A | * | 8/2000 | Grunwald .................... 429/212 |
| 6,194,874 B1 | * | 2/2001 | Kalogeropoulos et al. .. 320/160 |
| 6,514,638 B2 | * | 2/2003 | Kurose et al. ................ 429/60 |
| 2001/0004502 A1 | | 6/2001 | Nakamizo et al. |
| 2001/0004504 A1 | | 6/2001 | Nakamizo et al. |

FOREIGN PATENT DOCUMENTS

| | | |
|---|---|---|
| EP | 0 959 510 A2 | 11/1999 |
| EP | 1 191 622 A1 | 3/2002 |
| EP | 1 233 036 | 8/2002 |

(List continued on next page.)

OTHER PUBLICATIONS

Linden, Handbook of Batteries, $3^{rd}$ edition, pp 35–4 to 35–5, 2002. No month available.*
Linden, "Handbook of Batteries, 3rd edition", p 34–50. 2002. No month available.*
European Search Report Issued Dec. 16, 2003.

Primary Examiner—Carol Chaney
(74) Attorney, Agent, or Firm—Rader, Fishman & Grauer PLLC

(57) ABSTRACT

A lithium ion secondary battery including a positive electrode, a negative electrode, a separator and a nonaqueous electrolyte, where the separator essentially includes a porous sheet. The positive electrode active material and the negative electrode active material can be reversibly doped and dedoped such that, where Qp (mAh) is an electric charge necessary for causing total lithium contained in the positive electrode to be dedoped and Qn (mAh) is an electric charge necessary for causing lithium to fully dope the negative electrode, Qp>Qn. Further, when the battery is charged at a charging current Ic (mA) in a range of 0.2 Qn/h<Ic<2 Qn/h, in a range of an electric charge for charging Qc (mAh) of 1<Qc/Qn<Qp/Qn, doping of the positive electrode by lithium is initiated by producing lithium particles on the negative electrode by charging of the battery until Qc<Qp.

20 Claims, 3 Drawing Sheets

FOREIGN PATENT DOCUMENTS

| | | |
|---|---|---|
| GB | 2 357 896 | 7/2001 |
| JP | 05-62712 | 3/1993 |
| JP | 6-338347 | 6/1994 |
| JP | 07-153494 | 6/1995 |
| JP | 11-3731 | 1/1999 |
| JP | 11-45742 | 2/1999 |
| JP | 11-045740 | 2/1999 |
| JP | 2928779 | 5/1999 |
| JP | 2000-57847 | 2/2000 |
| JP | 2000-067917 | 3/2000 |
| JP | 3061756 | 4/2000 |
| JP | 3061759 | 4/2000 |
| JP | 2000-228215 | 8/2000 |
| JP | 3113652 | 9/2000 |
| JP | 2000-251932 | 9/2000 |
| JP | 2000-277147 | 10/2000 |
| JP | 2000-306610 | 11/2000 |
| JP | 2002-042867 | 2/2002 |
| JP | 2002-166218 | 6/2002 |
| WO | WO98/54778 | * 12/1998 |
| WO | WO-01/19906 A1 | 3/2001 |

\* cited by examiner

LITHIUM SECONDARY CELL, SEPARATOR, CELL PACK, AND CHARGING METHOD

TECHNICAL FIELD

The present invention relates to a low-cost lithium ion secondary battery with high safety during overcharge, to a separator employed therein, to a battery pack and to electric/electronic devices provided with the lithium ion secondary battery, and to a charging method for the lithium ion secondary battery.

BACKGROUND ART

With the recent popularity and increasing performance of portable electronic devices there has been a commensurate demand for secondary batteries with high energy density. This demand has been met by greater use of lithium ion secondary batteries which employ a carbon material that can be electrochemically doped and dedoped with lithium as the negative electrode active material and a lithium-containing transition metal oxide as the positive electrode active material.

This type of lithium ion secondary battery undergoes charge and discharge by migration of lithium ions between the positive and negative electrodes, by which storage and release of electrical energy are accomplished. The lithium ion secondary battery has a high energy density, because it outputs an average voltage of approximately 3.7 V which is about 3 times that of conventional secondary batteries, but, because aqueous electrolyte solutions cannot be used as for conventional secondary batteries, non-aqueous electrolyte solutions with sufficient oxidation-reduction resistance are used. For this reason, lithium ion secondary batteries are often referred to as non-aqueous secondary batteries.

Because non-aqueous secondary batteries use a flammable non-aqueous electrolyte solution as the electrolyte solution, there is a risk of combustion and, therefore, great caution must be taken for safety when they are used. While numerous situations can result in exposure to risk of combustion, overcharging is particularly dangerous.

In order to prevent overcharging, existing non-aqueous secondary batteries are charged with a constant current and constant voltage, and the batteries are provided with a precise protection circuit (safety circuit: IC+FET×2). Such protection circuits are costly and thus add to the cost of non-aqueous secondary batteries.

When overcharging is prevented by a protection circuit, the protection circuit sometimes fails to operate properly, and therefore it cannot be considered substantially safe. Existing non-aqueous secondary batteries include modifications such as the provision of a safety vent, PTC element and the use of a separator with a heat fuse function (shut down function) in order to safely destroy the battery in the event of overcharging if the protection circuit breaks during overcharging. However, even when such a means is provided, the safety during overcharging cannot always be reliably guaranteed, depending on the overcharging conditions and, in fact, combustion accidents still occur with non-aqueous secondary batteries.

Since safety measures against overcharging with non-aqueous secondary batteries are therefore still inadequate from the standpoint of safety and cost, a problem to be solved has remained, and various methods have been proposed to improve the problem.

One approach for improvement is aimed at destroying the battery in a safer manner when the protection circuit fails to function. Examples of this approach include addition of a compound that readily generates a gas upon overcharging and causes rapid actuation of a safety vent, as proposed in Japanese Patent No. 2928779, Japanese Patent No. 3061759, Japanese Patent No. 3113652, Japanese Unexamined Patent Publication No. 2000-306610 and elsewhere, addition of a compound that polymerizes upon overcharging, thus blocking the current, as proposed in Japanese Patent No. 3061756, and addition of a compound with an endothermic effect in the event of overcharging, as proposed in Japanese Unexamined Patent Publication No. 11-45740; some of these methods involving additives have been implemented and have improved the safety of non-aqueous secondary batteries.

Another approach is aimed at ensuring safety while also achieving cost savings by removal of the protection circuit or simple-protection as with a thermistor system. Examples of this approach include the use of redox shuttle additives, as proposed in Japanese Unexamined Patent Publication No. 6-338347, Japanese Unexamined Patent Publication No. 2000-251932, Japanese Unexamined Patent Publication No. 2000-277147, Japanese Unexamined Patent Publication No. 2000-228215 and elsewhere. Redox shuttle additives cause an oxidation-reduction reaction between the positive and negative electrodes upon overcharging, thus preventing overcharging by a mechanism which consumes the overcharge current. Some such additives have been implemented and have contributed to the improved safety of non-aqueous secondary batteries, but they have not succeeded in removing the protection circuit or simplifying it.

Japanese Unexamined Patent Application No. 2000-67917 proposes a technique related to preventing overcharging by employing a gel-polymer electrolyte film, and this suggests the possibility of eliminating or simplifying the protection circuit. However, the technique requires a film thickness of no less than 30 $\mu$m for the gel-polymer electrolyte film, with 40 $\mu$m or greater needed to obtain an adequate effect and even greater thicknesses in order to achieve a notable effect. This thickness is not widely used, though, considering that the separator thickness in most existing non-aqueous secondary batteries is 25 $\mu$m, and that the trend is toward a smaller separator thickness as increasingly higher energy density is pursued for batteries.

Japanese Unexamined Patent Application No. 2000-123824 also proposes a technique for preventing overcharging that employs a gel-polymer electrolyte, thus suggesting the possibility of eliminating or simplifying the protection circuit. According to this technique, overcharging is prevented by using a polyether oligomer, but the technique is not widely used because of the resulting very poor discharge characteristics of the battery compared to existing non-aqueous secondary batteries.

DISCLOSURE OF THE INVENTION

It is an object of the present invention to solve the above-mentioned problems of the prior art by providing a non-aqueous secondary battery which maintains practical battery characteristics while permitting elimination of the protection circuit or simple-protection thereof to a heat-sensitive switch system such as a thermistor and/or PTC element, thus increasing safety during overcharging and lowering cost compared to conventional non-aqueous secondary batteries.

In order to solve these problems, the invention provides a lithium ion secondary battery comprising a positive electrode, a negative electrode, a separator and a non-aqueous electrolyte, wherein 1) the separator is composed essentially of a porous sheet, 2) the positive electrode active material and the negative electrode active material can be reversibly doped and dedoped such that, where $Q_p$ (mAh) is an electric charge necessary for causing total lithium contained in the positive electrode to be dedoped and $Q_n$ (mAh) is an electric charge necessary for causing lithium to fully dope the negative electrode, $Q_p > Q_n$, and 3) when the battery is charged at a charging current Ic (mA) in a range of 0.2 $Q_n/h < I_c < 2$ $Q_n/h$, in a range of an electric charge for charging $Q_c$ (mAh) of $1 < Q_c/Q_n < Q_p/Q_n$, doping of the positive electrode by lithium is started through lithium particles produced on the negative electrode by charging of the battery and is continued up to $Q_c > Q_p$.

The invention further provides a lithium ion secondary battery pack comprising the aforementioned lithium ion secondary battery and a heat-sensitive switch system such as a thermistor and/or PTC element.

The invention still further provides a method for charging the aforementioned lithium ion secondary battery, which method comprises charging the lithium ion secondary battery by a constant current method, and determining completion of charging based on at least one of the following: battery temperature increase, battery voltage drop or battery voltage oscillation.

The invention still further provides electric/electronic devices comprising the aforementioned lithium ion secondary battery or lithium ion secondary battery pack.

The invention still further provides a lithium ion secondary battery separator comprising a sheet (A) with an average film thickness of 10–35 μm, a basis weight of 6–20 g/m², a gas permeability (JIS P8117) of no longer than 100 seconds, a MacMullin number of 10 or smaller and a MacMullin number×average film thickness value of no greater than 200 μm.

The invention still further provides a lithium ion secondary battery separator comprising a porous film with an average film thickness of 10–35 μm and a basis weight of 10–25 g/m², which contains a porous organic polymer film (B) that surrounds the above-mentioned sheet (A) and is swellable with the electrolyte solution and is retainable.

BEST MODE FOR CARRYING OUT THE INVENTION

Figure 1:
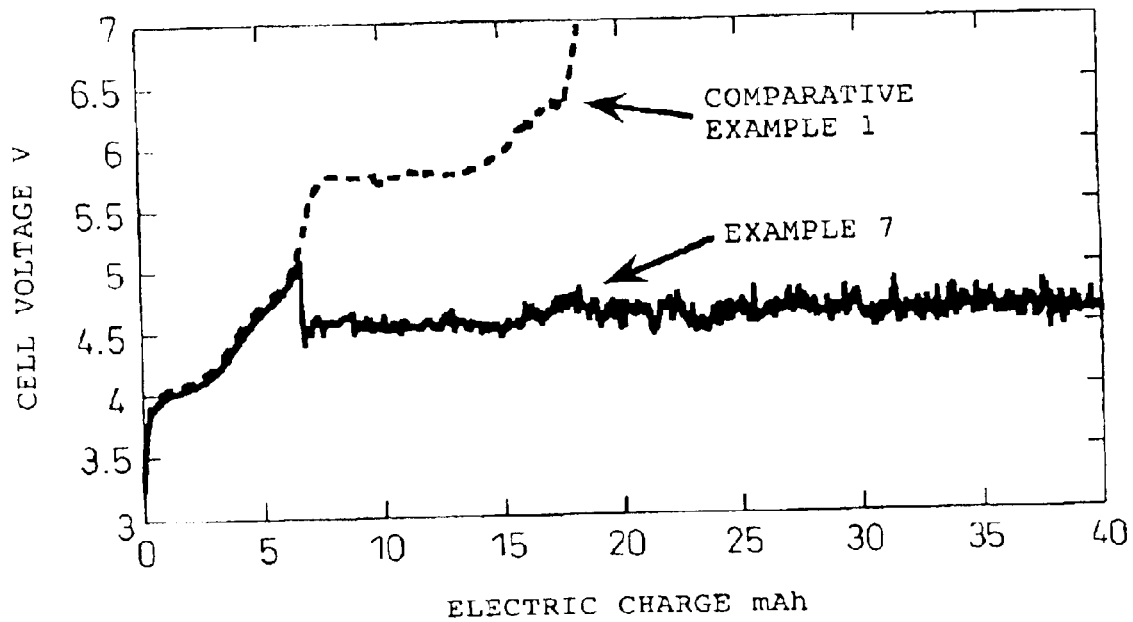
FIG. 1 is a graph showing voltage changes during overcharging for Example 8 and Comparative Example 6.

The present invention will now be explained in greater detail.

The lithium ion secondary battery of the invention is a battery comprising a positive electrode, a negative electrode, a separator and a non-aqueous electrolyte, wherein 1) the separator is composed essentially of a porous sheet, 2) the positive electrode active material and the negative electrode active material can be reversibly doped and dedoped such that, where $Q_p$ (mAh) is an electric charge necessary for causing total lithium contained in the positive electrode to be dedoped and $Q_n$ (mAh) is an electric charge necessary for causing lithium to fully dope the negative electrode, $Q_p > Q_n$, and 3) when the battery is charged at a charging current IC (mA) in a range of 0.2 $Q_n/h < I_c < 2$ $Q_n/h$, in a range of an electric charge for charging $Q_c$ (mAh) of $1 < Q_c/Q_n < Q_p/Q_n$, doping of the positive electrode by lithium is started through lithium particles produced on the negative electrode by charging of the battery and is continued up to $Q_c > Q_p$, and it exhibits the characteristics described below.

[Overcharge-Preventing Function]

When charging the lithium ion secondary battery of the invention at a practical charging current Ic such that 0.2 $Q_n/h < I_c < 2$ $Q_n/h$, doping cannot occur at the negative electrode during overcharge, such that the deposited lithium particles reach the vicinity of the positive electrode surface, doping the positive electrode, and this phenomenon continues up to $Q_c > Q_p$, thus preventing any further overcharge of the battery. The present inventors discovered that, if lithium particles deposited on the negative electrode surface are allowed to reach the vicinity of the positive electrode surface to a shallow overcharge depth at which the electric charge $Q_c$ is such that $1 < Q_c/Q_n < Q_p/Q_n$, then it is not only possible to guarantee the safety of the lithium ion secondary battery during overcharge, but the lithium particles reaching the vicinity of the positive electrode surface are doped at the positive electrode so that complete internal short-circuit does not occur between the positive and negative electrodes, and discharge is possible even after overcharge.

This overcharge-preventing function is characterized in that overcharging is prevented by doping of the positive electrode with lithium particles produced on the negative electrode during overcharging, and the safety of the battery is guaranteed during overcharging by continuation of this phenomenon until $Q_c > Q_p$; however, in order to guarantee even higher safety of the battery, the phenomenon is preferably continued up to $Q_c/3$ $Q_n$.

A lithium ion secondary battery in which this phenomenon occurs with $Q_c/Q_n < 1$ is a battery that cannot be fully charged, and is therefore not preferred. When the phenomenon does not appear with $Q_c/Q_n < Q_p/Q_n$, the phenomenon cannot occur with $Q_c/Q_n > Q_p/Q_n$, for reasons related to the lithium amount.

Needless to mention, in order to obtain a lithium ion secondary battery with this overcharge-preventing function, it is necessary for $Q_p$ and $Q_n$ to be such that $Q_p > Q_n$. The overcharge-preventing function of the battery of the invention is achieved by utilizing the lithium particles being deposited at the negative electrode surface during overcharging, but these lithium particles were originally contained in the positive electrode, and since the electric charge amount that can be used at that time is $Q_p - Q_n$, the overcharge-preventing function of the invention is impossible, in principle, if $Q_p < Q_n$.

In consideration of higher safety for the lithium ion secondary battery of the invention, it is preferred to use half of the amount of lithium remaining at the positive electrode when the negative electrode has been completely doped with lithium ($Q_p - Q_n$), to exhibit the overcharge-preventing function. That is, it is more preferred to exhibit the overcharge-preventing effect with a more shallow charging depth, at which $Q_c$ is such that $1 < Q_c/Q_n < 0.5(Q_p/Q_n + 1)$.

Here, $Q_p$ and $Q_n$ may be calculated from the weight of the positive electrode active material and negative electrode active material per unit area. They may also be determined by forming a three-electrode system battery using the positive electrode or negative electrode as the working electrode and lithium metal as the reference electrode and counter electrode, and measuring the charge/discharge.

The following method may be used to confirm this overcharge-preventing function in the battery of the invention. Specifically, the positive electrode and negative electrode are removed from the lithium ion secondary battery of the invention, and Qp and Qn are measured by the method described above to confirm the relationship Qp>Qn. Also, the positive electrode, negative electrode and separator are removed from the lithium ion secondary battery of the invention, the positive electrode and negative electrode are connected via the separator, and an electrolyte (electrolyte solution) is injected to fabricate evaluation battery 1. It is confirmed that when evaluation battery 1 is charged with a charging current Ic satisfying the condition 0.2 Qn/h<Ic<2 Qn/h, there is observed a battery voltage drop, a battery voltage oscillation or a general halt in battery voltage increase when Qc is in the range of 1<Qc/Qn<Qp/Qn. The electric charge is defined as Q1 (mAh) upon initiation of battery voltage drop, a battery voltage oscillation or a general halt in battery voltage increase. It is also confirmed that the battery voltage oscillation or the general halt in battery voltage increase, or depending on the case the battery voltage drop, continues up to Qc>Qp. The separator and positive electrode are then removed from the lithium ion secondary battery of the invention, and the positive electrode is connected to a negative electrode collector (i.e., Qn=0) via the separator, and an electrolyte (electrolyte solution) is injected to fabricate evaluation battery 2. For charging at a charging current Ic satisfying 0.2 Qn/h<IC<2 Qn/h, with the negative electrode collector in this evaluation battery 2 as the negative electrode, the electric charge is defined as Q2 (mAh) upon initiation of battery voltage drop, battery voltage oscillation or general halt in battery voltage increase. Here, if the relationship Q1>Q2 (ideally Q2=Q1−Qn) is true, then the observed battery voltage drop, battery voltage oscillation or general halt in battery voltage increase will depend on the lithium particles produced on the negative electrode which were originally contained in the positive electrode, and the desired overcharge-preventing function can be confirmed.

In the test described above, when removal of the negative electrode collector is difficult, a copper foil or lithium foil may be used instead of the electrode collector. An electrolyte solution commonly used in lithium ion secondary batteries may be employed as the electrolyte solution for the test.

When the overcharge-preventing function is exhibited in a lithium ion secondary battery of the invention, the electrical energy introduced by the procedure of charging is released out of the system as Joule's heat. The Joule's heat is represented by (charging current×battery voltage). Thus, if a large charging current is used the effect of Joule's heat will be dominant, and it will be difficult to accurately evaluate the overcharge-preventing effect. For application in a practical charging current Ic range of 0.2 Qn/h<Ic<2 Qn/h, a smaller capacity is preferred for the evaluation battery. A button-type (coin-type) battery is preferable for the evaluation batteries described above, but there is no limitation thereto.

The aforementioned overcharge-preventing function may be explained as follows for the most common type of lithium ion secondary battery employing lithium cobaltate as the positive electrode and a carbon material that can be doped/dedoped with lithium as the negative electrode. This type of lithium ion secondary battery system is usually designed so that Qn is about half of the Qp. That is, 2 Qn=Qp. with conventional lithium ion secondary batteries of this type at sizes used for cellular phones, explosion and combustion occur if the charging rate at which all of the lithium is depleted from the positive electrode when charging at 1 C (charging current Ic=Qn/h) exceeds approximately 200% of charging percentage (electric charge Qc=Qp).

In light of this, it is possible to guarantee safety during overcharge by preventing total depletion of the lithium from the positive electrode, i.e. by halting further charging, but the overcharge-preventing function in the lithium ion secondary battery of the invention is characterized by accomplishing this via the lithium particles deposited on the negative electrode during overcharge. That is, it is necessary to start doping of the positive electrode with lithium particles at a charging percentage of no greater than 200% (Qc<Qp), and more preferably no greater than 150% (Qc<0.5(Qp+Qn)).

Overcharging will not be prevented without continued doping of the positive electrode with the lithium particles deposited on the negative electrode. That is, it must be continued at a charging rate of at least 200% (Qc>Qp) and more preferably at least 300% (Qc>3Qn).

The lithium ion secondary battery of the invention having an overcharge-preventing function based on the mechanism described above has the following features.

1) When the battery is charged at a charging current IC which satisfies 0.2 Qn/h<Ic<2 Qn/h, Qc at which a drop in battery voltage occurs, an oscillation in battery voltage occurs, or the increase in battery voltage generally halts is in the range of 1<Qc/Qn<Qp/Qn.

Here, a drop in battery voltage occurs when the lithium particles produced on the negative electrode are doped on the positive electrode. An oscillation in battery voltage indicates intermittent doping of the lithium particles. The battery voltage drop and oscillation depend on the internal resistance of the battery, being more difficult to observe when the internal resistance of the battery is lower. In such cases, they can sometimes be observed by radically reducing the voltage sampling time. The battery voltage drop and battery voltage oscillation are also very difficult to observe in cases with a very rapid cycle of deposition of the lithium particles on the negative electrode and doping onto the positive electrode. When the turn over cycle is rapid and the internal impedance of the battery is low, an apparent phenomenon of a general halt in battery voltage increase is observed.

2) When the battery is charged at a charging current Ic which satisfies 0.2 Qn/h<Ic<2 Qn/h, battery voltage oscillation of 10 mV or greater starts and continues to Qc>Qp, when the electric charge Qc is in the range of 1<Qc/Qn<Qp/Qn.

Thus, the battery voltage oscillation is proof of repetition of the cycle of deposition of lithium particles on the negative electrode and doping onto the positive electrode, and an adequate overcharge-preventing function is exhibited if this continues up to Qc<Qp.

3) When the battery is charged at a charging current Ic which satisfies 0.2 Qn/h<Ic<2 Qn/h to Qc such that 2<Qc/Qn<3 and then discharged at a discharging current Id such that 0.1 Qn/h<Id<0.5 Qn/h, the discharge capacity Qd is in the range of 1<Qd/Qn<Qp/Qn.

The lithium ion secondary battery of the invention can be discharged thereafter, since a complete internal short-circuit does not occur. If the overcharge-preventing mechanism is working, then the discharge capacity Qd is in the range of 1<Qd/Qn<Qp/Qn, taking into account the lithium remaining on the negative electrode.

4) When charging with a charging current Ic satisfying 0.2 Qn/h<Ic<2 Qn/h, the battery voltage is no greater than 5.5 V in the total range where the electric charge Qc is such that 1<Qc/Qn<1.5Qp/Qn.

Since further charging is prevented in the lithium ion secondary battery of the invention by the mechanism described above, the battery voltage never rises to a voltage at which the electrolyte (electrolyte solution) decomposes. This means that when the overcharge-preventing function is working, the voltage never exceeds 5.5 V so long as a positive electrode material is used which is currently in general use.

5) The relationship between the battery internal impedance $R_{0.5}$ at 1 kHz when Qc satisfies Qc/Qn=0.5 and the battery internal impedance $R_2$ at 1 kHz when Qc=Qp, is $1.5R_{0.5}>R_2$.

When the overcharge-preventing function is working, the decomposition which usually accompanies overcharge does not occur, and hence there is no notable increase in the internal impedance of the battery.

6) For Qc in the range of Qp<Qc<1.5 Qp, the maximum length of the lithium particles produced on the negative electrode by charging of the battery is 100 $\mu$m or smaller.

This overcharge-preventing function is exhibited because the lithium particles deposited on the negative electrode are rendered fine so that they rapidly reach the vicinity of the positive electrode surface.

The lithium ion secondary battery of the invention possesses all of the above features 1) to 6) in principle, but when the charging current increases with greater battery capacity, there will be some cases in which not all of the features are exhibited due to the problem of Joule's heat. Generally speaking, the overcharge-preventing function required for the lithium ion secondary battery of the invention can be confirmed by satisfying one, or more preferably two of the above features 1) to 6).

As an expected result of the overcharge-preventing function, the lithium ion secondary battery of the invention produces no abnormal decomposition of the electrolyte solution during overcharge, but also causes no destruction of the crystal structure of the positive electrode. The absence of abnormal decomposition of the electrolyte solution can be confirmed by a method such as GC-MS. The absence of destruction of the crystal structure of the positive electrode can be confirmed from the peak pattern in x-ray diffraction.

[Electrodes]

For the positive electrode and negative electrode in the lithium ion secondary battery of the invention there are used active materials capable of reversible doping and dedoping of lithium, and materials commonly employed in lithium ion secondary batteries may be used without any particular restrictions so long as Qp and Qn satisfy the relationship Qp>Qn.

The positive electrode and negative electrode will generally each be composed of an active material, a binder polymer that binds the active material and retains the electrolyte solution, and a collector. A conducting aid may also be added to improve the conductivity of the electrodes.

A lithium-containing transition metal oxide such as $LiCoO_2$, $LiMn_2O_4$ or $LiNiO_2$ is preferably used as the positive electrode active material in the lithium ion secondary battery of the invention. For the negative electrode active material there is preferably used a sintered organic polymer compound such as polyacrylonitrile, phenol resin, phenol-novolac resin or cellulose, sintered coke or pitch, or a carbon material such as artificial graphite or natural graphite.

As binder polymers there may be used fluorine resins such as polyvinylidene fluoride (PVdF), PVdF copolymer resins including copolymers of PVdF and hexafluoropropylene (HFP) or perfluoromethyl vinyl ether (PFMV) and tetrafluoroethylene, and polytetrafluoroethylene, fluorine rubber, etc.; hydrocarbon-based polymers such as styrene-butadiene copolymer and styrene-acrylonitrile copolymer; and carboxymethyl cellulose, polyimide resins, and the like, but there is no limitation to these. They may also be used either alone or in combinations of two or more.

For the collectors, a material with excellent oxidation resistance is used at the positive electrode and a material with excellent reduction resistance is used at the negative electrode. Specifically, aluminum, stainless steel, etc. may be mentioned for the positive electrode collector and copper, nickel, stainless steel, etc. may be mentioned for the negative electrode collector. The shape may be that of a foil or mesh. Particularly, an aluminum foil is preferred for the positive electrode collector and a copper foil is preferred for the negative electrode collector.

Carbon black (acetylene black) is preferably used as a conducting aid, but there is no limitation thereto.

Regarding the mixing ratio of the active material, binder polymer and conducting aid, a range of 3–30 parts by weight is preferred for the binder polymer and a range of 0–10 parts by weight is preferred for the conducting aid, with respect to 100 parts by weight of the active material.

The method of manufacturing the electrode is not particularly restricted, and any publicly known method may be employed.

[Separator]

Two forms of the separator are preferred for use in the lithium ion secondary battery of the invention.

The first form is a sheet (A) with an average film thickness of 10–35 $\mu$m, a basis weight of 6–20 g/m$^2$, a gas permeability (JIS P8117: the time required for 100 cc of air to permeate an area of 1 in$^2$ at a pressure of 2.3 cmHg) of no longer than 100 seconds, a MacMullin number of 10 or smaller and a MacMullin number×average film thickness value of no greater than 200 $\mu$m. This type of sheet has large gaps and, as the assembled battery has numerous through-holes with an approximate ratio (curvature) of 1 between the minimum length between the positive and negative electrodes measured along the throughholes in the separator and the separator film thickness, it is easier for the lithium particles produced on the negative electrode to reach the vicinity of the positive electrode surface during overcharging. This is therefore preferred, in order to exhibit the overcharge-preventing function described above.

A sheet with an average film thickness of less than 10 $\mu$m and a basis weight of less than 6 g/m$^2$ more readily exhibits the overcharge-preventing function, but it has insufficient strength and is prone to short-circuiting, and is therefore not preferred as the separator.

The normalized puncture strength can serve as an indicator in consideration of avoiding short-circuiting. The normalized puncture strength is preferably at least 3 g/$\mu$m, and the effective puncture strength (normalized puncture strength×film thickness) is preferably at least 80 g. The normalized puncture strength is the value determined by setting the sheet in a 11.3 mm$\phi$ fixed frame, sticking a needle with a 0.5 mm tip radius vertically into the center of the sheet, pushing the needle in at a fixed speed of 50 mm/min, and normalizing the force on the needle when a hole is opened in the sheet based on the average film thickness of the sheet.

With a sheet having an average film thickness of less than 10 $\mu$m and a basis weight of less than 6 g/m$^2$, it is difficult to obtain a sheet satisfying the conditions for the puncture strength.

Also, a sheet having an average film thickness of greater than 35 μm, a basis weight of greater than 20 g/m² and a gas permeability (JIS P8117) exceeding 100 seconds is not only disadvantageous in terms of the overcharge-preventing function, but is also not preferred from the standpoint of reduced battery characteristics and reduced energy density accompanying the increased internal impedance. When the battery characteristics are considered, the sheet (A) preferably has a MacMullin number of 10 or smaller and a MacMullin number×average film thickness value of no greater than 200 μm. More preferably, the MacMullin number×average film thickness value is no greater than 150 μm. Here, the MacMullin number is an indicator of the ion conductivity of the battery separator, and it is the ratio of the impedance of the sheet (A) impregnated with the electrolyte solution with respect to the impedance of the electrolyte solution alone. Throughout the present specification, the MacMullin number refers to the value measured at 25° C. When the sheet has an average film thickness of greater than 35 μm, a basis weight of greater than 20 g/m² and a gas permeability (JIS P8117) exceeding 100 seconds, it is difficult to satisfy the conditions for the MacMullin number and MacMullin number×average film thickness value.

As a specific examples for the sheet (A) there may be mentioned a sheet having hard protrusions or laser-opened holes in a film with a structure such as a polyolefin fine porous film commonly used for separators in lithium ion secondary batteries, or a sheet formed from fibers such as a nonwoven fabric; however, the sheet (A) is not particularly limited so long as it satisfies the conditions given above.

When the sheet (A) is composed of fibers, the average fiber diameter of the fibers composing the sheet is preferably ½ to ¹⁄₁₀ of the average film thickness of the sheet (A). If the average fiber diameter is less than ¹⁄₁₀ of the average film thickness of the sheet (A), the curvature is increased, not only making it impossible to obtain adequate battery characteristics but also posing a disadvantage in terms of the overcharge-preventing function. If the average fiber diameter is greater than ½ of the average film thickness of the sheet (A), there is less intertwining between the fibers, making it impossible to obtain a sheet with adequate strength. The mesh of the sheet (A) is also too large, causing short-circuiting problems when the battery is fabricated. When such a sheet (A) is used with the second form of the separator of the invention described below, numerous pinholes are produced and a satisfactory separator cannot be obtained.

When the sheet (A) is composed of fibers, it is preferably in the form of a nonwoven fabric. The method of fabricating the nonwoven fabric may be any commonly used dry sheeting method, spun bond method, water needle method, spun lace method, wet sheeting method and melt blow method. The wet sheeting method is particularly preferred among these methods because it can easily give a uniform, thin nonwoven fabric.

The overcharge-preventing function of the lithium ion secondary battery of the invention is believed to be closely related to the separator structure (texture), and not particularly related to the material of which the sheet (A) is composed. In other words, the sheet (A) can be suitably used so long as it is made of a material with sufficient oxidation resistance and reduction resistance. Such materials include polyesters, aromatic polyamides, polyphenylene sulfide, polyolefins and the like. These may be used alone or in combinations of two or more. The material composing the sheet (A) need only have a molecular weight sufficient to obtain a molded article, and in most cases a molecular weight (weight average molecular weight: MW) of 5000 or greater is suitable.

The second form is a porous film with an average film thickness of 10–35 μm and a basis weight of 10–25 g/m², which contains a porous organic polymer film (B) that surrounds the above-mentioned sheet (A) and is swellable with the electrolyte solution and is retainable. Although this second form may be slightly inferior to the above-mentioned form in which the separator is composed of the sheet (A) alone in terms of the overcharge-preventing function since it may impede the lithium particles deposited on the negative electrode from reaching the vicinity of the positive electrode surface during overcharge, it is still possible to amply guarantee the safety of the lithium ion secondary battery during overcharge so long as the conditions described above are satisfied. On the other hand, the advantage of the second form over the first form is improved retention of the electrolyte solution and greater short-circuiting resistance, and it is therefore effective for film-cased batteries to meet the demand for strict conditions against solution leakage, or batteries having a structure in which the separator is wrapped flat, such as in square-shaped batteries, in order to meet the demand for strict conditions against short-circuiting.

If the average film thickness is less than 10 μm and the weight is less than 10 g/m² in this second form, sufficient strength as a separator cannot be achieved, and problems such as short-circuiting can occur. As with the first form, it becomes difficult to achieve the characteristic values including a normalized puncture strength of 3 g/μm or greater and an effective puncture strength of 80 g or greater.

An average film thickness of greater than 35 μm and a basis weight of greater than 25 g/m² is not only disadvantageous for the overcharge-preventing function, but can also lead to reduced battery characteristics. In particular, the low temperature characteristics will sometimes be undesirable. As with the first form, it is difficult to obtain a porous film of this type having a MacMullin number of 10 or smaller and a film thickness×MacMullin number value of no greater than 200 μm.

As mentioned above, the overcharge-preventing function of the lithium ion secondary battery of the invention is essentially independent of the material of which the separator is composed, and therefore the porous organic polymer film (B) need only be a material that can be swelled with the electrolyte solution and retain it, and that has adequate oxidation/reduction-resistance for use in a battery. From this standpoint, suitable materials for the porous organic polymer film (B) include polyvinylidene fluoride (PvdF) copolymers composed primarily of (PvdF). The molecular weight of the PVdF copolymer is preferably in the range of 10,000 to 1 million as the weight average molecular weight (Mw).

A suitable polymerization ratio of the vinylidene fluoride (VdF) in the PVdF copolymer is in the range of 92–98 mole percent as the molar fraction of VdF. If the molar fraction of VdF exceeds 98%, the crystallinity of the polymer is too high, not only making it difficult to form the separator but also undesirably lowering the degree of swelling with the electrolyte solution. If the molar fraction of VdF is less than 92%, the crystallinity of the polymer is too low, and this may undesirably reduce the mechanical properties and heat resistance of the porous film retaining the electrolyte solution.

As particularly preferred PVdF copolymers there may be mentioned terpolymers composed of VdF, HFP and CTFE. The copolymerization composition of the copolymer is most preferably VdF/HFP(a)/CTFE(b) [where (a)=2–8 wt % and (b)=1–6 wt %].

If the copolymerization ratio of HFP (a) is less than 2 wt %, the degree of swelling with non-aqueous electrolyte solutions tends to undesirably decrease. If it exceeds 8 wt %, the elasticity of the film is reduced making it impossible to adequately retain a large amount of electrolyte solution, while the heat resistance also tends to undesirably decrease when the electrolyte solution is retained.

The copolymerization ratio of CTFE (b) is preferably 1–6 wt %. If the CTFE ratio is less than 1 wt % the effect of adding the CTFE is inadequate, and it tends to become difficult to maintain heat resistance and improve the electrolyte solution retention. If it is added at greater than 6 wt %, the degree of swelling with the electrolyte solution tends to be undesirably reduced.

These PVdF copolymers may be used alone, or they may be used as mixtures of two or more different copolymers. If necessary, they may be blended with electrolyte solution-swelling non-fluorine polymers such as polyacrylonitrile (PAN), polymethyl methacrylate (PMMA) or polyethylene oxide (PEO).

The porous film may also contain a porous inorganic filler if necessary, in addition to the sheet (A) and porous organic polymer film (B). By including a porous inorganic filler it is possible to improve the short-circuit resistance of the film without sacrificing ion conductivity. As suitable inorganic fillers there may be mentioned porous particles of silica, alumina or the like with a particle size of 0.1–10 μm.

The porous film can be obtained by impregnating and coating the sheet (A) into a solution of the polymer used to form the porous organic polymer film (B), and then removing the solvent. The following methods may be mentioned as specific methods for fabrication of the porous film.

1. A method in which a polymer used to form the porous organic polymer film (B), a solvent which dissolves it and is compatible with water, and a phase separating agent (gelling agent or pore forming agent) are mixed and dissolved together, the sheet (A) is impregnated and coated with the dope solution, and the resulting film is then immersed in an aqueous coagulation bath to coagulate the polymer used to form the porous organic polymer film (B), and finally washed and dried to obtain a porous film.

2. A method in which a polymer used to form the porous organic polymer film (B), a volatile solvent which dissolves it and a plasticizing agent are mixed and dissolved together and the sheet (A) is impregnated and coated with the dope solution and then dried to remove the volatile solvent, after which the plasticizing agent is dissolved and then extracted with a volatile solvent that does not dissolve the polymer used to form the porous organic polymer film (B), and drying is carried out to obtain a porous film.

3. A method in which a polymer used to form the porous organic polymer film (B) is mixed with a plasticizing agent, the mixture is heated to plasticize and melt the polymer used to form the porous organic polymer film (B) and the sheet (A) is impregnated and coated with this dope, after which the film is cooled to hardness, the plasticizer is dissolved and then extracted with a volatile solvent that does not dissolve the polymer used to form the porous organic polymer film (B), and drying is carried out to obtain a porous film.

The second form of the separator of the invention is advantageous over the first form in terms of the electrolyte solution impregnation and retention. The electrolyte solution impregnation can be evaluated by the amount of electrolyte solution impregnated. Throughout the present specification, the amount of electrolyte solution impregnation will be represented by the weight percentage of electrolyte solution impregnated with respect to the dry weight of the separator.

The retention of the separator for the electrolyte solution can be evaluated by, specifically, centrifuging the separator impregnated with the non-aqueous electrolyte solution with centrifugal force of 1400×g (gravitational acceleration) for 20 minutes to remove the weakly retained non-aqueous electrolyte solution. Throughout the present specification, the retention of the electrolyte solution will be represented by the weight percentage of the separator after centrifugation with respect to the separator before centrifugation. The retention of the electrolyte solution is preferably at least 70 wt %, and more preferably at least 80 wt %.

Considering the handling property during manufacture of the battery, the separator described above which is used in the lithium ion secondary battery of the invention preferably has a proof stress of at least $1.5 \times 10^2$ N/m, and especially at least $3.0 \times 10^2$ N/m. The proof stress indicates the elastic limit strength and the degree of tensile force at which the film can be handled, with a higher value signifying easier handling and higher productivity.

The proof stress is usually determined by a tensile test. According to the invention, the proof stress was calculated from a stress-strain curve obtained by cutting out a 1 cm×3 cm strip from the separator, and performing a tensile test by tension at a pull rate of 20 mm/min.

The heat deformation temperature of the separator of the invention is preferably 150° C. or higher, and more preferably 170° C. or higher. The heat deformation temperature can be evaluated by thermal mechanical analysis (TMA). The evaluation of the heat deformation temperature by TMA can be determined by cutting a 4 mm wide strip from the separator, placing a 0.01 N load thereon, and determining the heat deformation temperature as the temperature at which at least a 2% change in length (elongation) occurs when the temperature is increased at a rate of 10° C./min.

[Non-aqueous Electrolyte]

The non-aqueous electrolyte used in the lithium ion secondary battery of the invention may be a solution of a lithium salt in a non-aqueous solvent, as is commonly employed for lithium ion secondary batteries.

As specific examples of non-aqueous solvents there may be mentioned propylene carbonate (PC), ethylene carbonate (EC), butylene carbonate (BC), vinylene carbonate (VC), dimethyl carbonate (DMC), diethyl carbonate (DEC), methylethyl carbonate (MEC), 1,2-dimethoxyethane (DME), 1,2-diethoxyethane (DEE), γ-butyrolactone (γ-BL), sulfolane and acetonitrile. These non-aqueous solvents may be used alone or in combinations of two or more. Particularly suitable for use are any one or more solvents selected from among PC, EC, γ-BL, DMC, DEC, MEC and DME.

As lithium salts that dissolve in such non-aqueous solvents there may be mentioned lithium perchlorate ($LiClO_4$), lithium hexafluorophosphate ($LiPF_6$), lithium borotetrafluoride ($LiBF_4$), lithium hexafluoroarsenate ($LiAsF_6$), lithium trifluorosulfonate ($CF_3SO_3Li$), lithium perfluoromethylsulfonylimide [$LiN(CF_3SO_2)_2$] and lithium perfluoroethylsulfonylimide [$LiN(C_2F_5SO_2)_2$], but there is no limitation to these. These may also be used in combinations of two or more. The concentration of the dissolved lithium salt is preferably in the range of 0.2–2 M (moles/L).

[Fabrication of Lithium Ion Secondary Battery]

The method of fabricating the lithium ion secondary battery of the invention is not particularly restricted, and any publicly known fabrication method for lithium ion secondary batteries may be employed.

Specifically, one common method involves placing the positive electrode and negative electrode, which have been coupled via the separator, in a case and then injecting the electrolyte therein and sealing it. Vacuum injection is preferably used as the method of injecting the electrolyte, but there is no particular limitation thereto. The coupled electrodes may also be impregnated with the electrolyte solution before being placed in the case.

For film-cased batteries in which the case is a pack composed of an aluminum-plastic laminated film, the electrodes and separator are preferably integrated by bonding. In this case, the separator is preferably a porous film of the aforementioned second form. Bonding of the separator and electrodes is accomplished mainly by thermo-compression bonding, and this may be carried out in a dry state without the electrolyte or in a wet state containing the electrolyte. When the adhesive strength between the separator and electrode is satisfactory, it is possible to fabricate the battery without a thermo-compression bonding step.

[Lithium Ion Secondary Battery]

There are no particular restrictions on the shape of the lithium ion secondary battery of the invention, and it may have any shape, such as cylindrical, prismatic, flat or button-shaped.

The case may be a steel can, aluminum can or a pack made of an aluminum-plastic laminated film, but there is no limitation to these.

When the aforementioned overcharge-preventing function is exhibited with the lithium ion secondary battery of the invention, the procedure of charging causes the introduced electrical energy to be discharged out of the system as Joule's heat. This Joule's heat is expressed as (charging current×battery voltage). Since the battery voltage is roughly constant while the overcharge-preventing function is exhibited, Ic is the dominant factor for the Joule's heat. Although it depends on the Ic employed, an increase in the internal battery temperature by the Joule's heat can expose the battery to danger such as ignition. The shape of the lithium ion secondary battery of the invention is therefore selected to result in satisfactory heat release efficiency, depending on the Ic employed. From the standpoint of improving the heat release efficiency, a film-cased battery using an aluminum-plastic laminated pack as the sheath is preferred. There may also be employed a method in which a radiator plate is mounted on the battery.

Generation of gas due to oxidative decomposition of the electrolyte solution is suppressed in the lithium ion secondary battery of the invention as a result of the above-mentioned overcharge-preventing function. Strict conditions are required for film-cased batteries in terms of battery swelling, and from this standpoint as well, the lithium ion secondary battery of the invention is preferably used in the form of a film-cased battery. Also, although safety vents are commonly mounted in conventional lithium ion secondary batteries, since gas generation during overcharge is suppressed in the lithium ion secondary battery of the invention, it is possible to sufficiently guarantee safety during overcharge without provision of a safety vent. However, safety will of course be further improved if a safety vent is present.

Safety during overcharge in the lithium ion secondary battery of the invention may not be guaranteed in some cases depending on the charging current Ic employed, because of the problem of Joule's heat. The overcharge-preventing function of the lithium ion secondary battery of the invention is not preferred in principle for high-current (rate) charging. However, even using the publicly known additives proposed for improvement of safety during overcharge is inadequate for guaranteeing safety during overcharge with high-current (rate) charging. Since the overcharge-preventing function of the lithium ion secondary battery of the invention is based on a fundamentally different mechanism than the use of publicly known additives, such additives may also be used. The combined use of such publicly known additives can therefore adequately guarantee safety during overcharge even with high-current (rate) charging.

[Battery Pack]

The battery pack of the invention is provided with at least a lithium ion secondary battery of the invention and a heat-sensitive sensor (thermo-sensor) or heat-sensitive switch (thermistor and/or PTC).

As mentioned above, Joule's heat is generated when the overcharge-preventing function of the lithium ion secondary battery of the invention is exhibited. Overcharge can be detected in the lithium ion secondary battery of the invention by this heat energy, and therefore provision of a heat-sensitive sensor (thermo-sensor) or heat-sensitive switch (thermistor and/or PTC) in the battery pack is effective from the standpoint of safety.

Although safety during overcharge can be sufficiently guaranteed with a heat-sensitive sensor (thermo-sensor) or heat-sensitive switch (thermistor and/or PTC) in the lithium ion secondary battery of the invention, it may also be equipped with a protection circuit. The safety of the battery is further improved by provision of a protection circuit.

[Charging Method]

The charging method of the invention comprises charging the lithium ion secondary battery of the invention by a constant current method, and judging completion of charging by at least one of the following: battery temperature increase, battery voltage drop or battery voltage oscillation.

The lithium ion secondary battery of the invention is characterized not only by guaranteeing safety during overcharging by the overcharge-preventing function as described above, but also by being capable of discharge thereafter. The start of the overcharge-preventing function can be detected by the start of battery temperature increase due to Joule's heat, battery voltage drop or battery voltage oscillation. Detection of the overcharge-preventing function means that the battery is fully charged. Thus, constant current charging is possible whereby the completion of charging is judged by battery temperature increase, battery voltage drop or battery voltage oscillation.

However, the charging method for the lithium ion secondary battery of the invention is not limited to the aforementioned method, and any commonly employed constant current/constant voltage charging method may be used.

[Electric/electronic Devices]

According to the invention there are also provided electric/electronic devices equipped with the lithium ion secondary battery or lithium ion secondary battery pack of the invention.

The lithium ion secondary battery or lithium ion secondary battery pack of the invention can be suitably used in portable electronic devices such as cellular phones or laptop computers. In particular, employing the charging method described above can greatly shorten the charging time as compared to ordinary constant current/constant voltage charging methods.

The present invention will now be explained in greater detail by way of examples.

[Separator]

EXAMPLE 1

Binder polyethylene terephthalate (PET) short fibers with a fineness of 0.22 dtex (average fiber diameter: approximately 4.5 $\mu$m) were blended with oriented and crystallized PET short fibers with a fineness of 0.33 dtex (average fiber diameter: approximately 5.5 μm) at a weight ratio of 4/6, and a film was formed to a basis weight of 12 g/m² by a wet sheeting method and subjected to calender rolling at 200° C., to obtain a nonwoven fabric sheet. The properties of the obtained sheet were as follows.

Average film thickness: 18 μm, gas permeability: 0.07 seconds, normalized puncture strength: 5.0 g/μm (90 g), MacMullin number: 5.0 (MacMullin number×film thickness value=90 μm).

EXAMPLE 2

Numerous holes with a diameter of 2 μm were opened evenly in a polypropylene (PP) fine porous film (CELGARD TM2400, product of Celgard Co.) using a needle. The properties of the obtained sheet were as follows.

Average film thickness: 25 μm, basis weight: 13.5 g/m², gas permeability: 80 seconds, normalized puncture strength: 12 g/μm (300 g), MacMullin number: 5.8 (MacMullin number×film thickness value=145 μm).

EXAMPLE 3

Binder PET short fibers with a fineness of 1.22 dtex (average fiber diameter: approximately 11 μm) were blended with oriented and crystallized PET short fibers with a fineness of 0.55 dtex (average fiber diameter: approximately 7 μm) at a weight ratio of 5/5, and a film was formed to a basis weight of 12 g/m² by a wet sheeting method and subjected to calender rolling at 160° C., to obtain a nonwoven fabric sheet. The properties of the obtained sheet were as follows.

Average film thickness: 18 μm, gas permeability: 0.04 seconds, normalized puncture strength: 6.5 g/μm (117 g), MacMullin number: 9.0 (MacMullin number×film thickness value=162 μm).

A PvdF copolymer composed of VdF:HFP:CTFE= 95.5:2.3:2.2 (molar ratio) was dissolved in a mixed solvent containing N,N-dimethylacetamide (DMAc) and polypropylene glycol (PPG) with an average molecular weight of 400 in a ratio of 6/4 (weight ratio) at 60° C., to prepare a film-forming dope with a copolymer concentration of 14 wt %. The obtained dope was used for impregnation and coating of the above-mentioned nonwoven fabric sheet, and then the resulting film was immersed in an aqueous solution with a solvent concentration of 40 wt %, coagulated and then washed and dried to obtain a porous film. The properties of the obtained porous film were as follows.

Average film thickness: 26 μm, basis weight: 21.1 g/m², normalized puncture strength: 5.5 g/μm (144 g), MacMullin number: 5.9 (MacMullin number×film thickness value=153 μm), proof stress: 3.5×10² N/m.

EXAMPLE 4

Crystallized m-aramide short fibers with a fineness of 0.9 dtex (fiber diameter: approximately 10 μm) were used to form a film with a basis weight of 15 g/m² by a dry sheeting method, and this was subjected to calender rolling at 320° C. to obtain a nonwoven fabric sheet. The properties of the obtained sheet were as follows.

Average film thickness: 30 μm, gas permeability: 0.04 seconds, normalized puncture strength: 5.6 g/μm (95 g), MacMullin number: 5.8 (MacMullin number×film thickness value=98.6 μm).

A PVdF copolymer composed of VdF:HFP:CTFE= 95.5:2.3:2.2 (molar ratio) was dissolved in a mixed solvent containing N,N-dimethylacetamide (DMAc) and polypropylene glycol (PPG) with an average molecular weight of 400 in a ratio of 6/4 (weight ratio) at 60° C., to prepare a film-forming dope with a copolymer concentration of 10 wt %. The obtained dope was used for impregnation and coating of the above-mentioned nonwoven fabric sheet, and then the resulting film was immersed in an aqueous solution with a solvent concentration of 40 wt %, coagulated and then washed and dried to obtain a porous film. The properties of the obtained porous film were as follows.

Average film thickness: 34 μm, basis weight: 20.9 g/m², normalized puncture strength: 9.7 g/μm (330 g), MacMullin number: 4.6 (MacMullin number×film thickness value=156 μm), proof stress: 6.4×10² N/m.

EXAMPLE 5

Binder PET short fibers with a fineness of 0.22 dtex (average fiber diameter: approximately 4.5 μm) were blended with crystallized m-aramide short fibers with a fineness of 0.55 dtex (average fiber diameter: approximately 7 μm) at a weight ratio of 4/6, and a film was formed to a basis weight of 11 g/m² by a wet sheeting method and subjected to calender rolling at 200° C., to obtain a nonwoven fabric sheet. The properties of the obtained sheet were as follows.

Average film thickness: 17 μm, gas permeability: 0.06 seconds, normalized puncture strength: 5.6 g/μm (95 g), MacMullin number: 5.8 (MacMullin number×film thickness value=99 μm).

After impregnating and coating this nonwoven fabric sheet with the same dope as prepared in Example 3, the obtained film was immersed in an aqueous solution with a solvent concentration of 40 wt %, coagulated and then washed and dried to obtain a porous film. The properties of the obtained porous film were as follows.

Average film thickness: 24 μm, basis weight: 16.7 g/m², normalized puncture strength: 5.0 g/μm (120 g), MacMullin number: 5.4 (MacMullin number×film thickness value=130 μm), proof stress: 3.5×10² N/m.

EXAMPLE 6

A PVdF copolymer composed of VdF:HFP:CTFE= 95.5:2.3:2.2 (molar ratio) was dissolved in a mixed solvent containing N,N-dimethylacetamide (DMAc) and polypropylene glycol (PPG) with an average molecular weight of 400 in a ratio of 6.5/3.5 (weight ratio) at 60° C., to prepare a film-forming dope with a copolymer concentration of 12 wt %. The obtained dope was used for impregnation and coating of the nonwoven fabric sheet formed in Example 1, and then the resulting film was immersed in an aqueous solution with a solvent concentration of 40 wt %, coagulated and then washed and dried to obtain a porous film. The properties of the obtained porous film were as follows.

Average film thickness: 24 μm, basis weight: 19.7 g/m², normalized puncture strength: 6.3 g/μm (151 g), MacMullin number: 6.5 (MacMullin number×film thickness value=156 μm), proof stress: 3.8×10² N/m.

EXAMPLE 7

Binder PET short fibers with a fineness of 1.22 dtex (average fiber diameter: approximately 11 μm) were blended with oriented and crystallized PET short fibers with a fineness of 0.11 dtex (average fiber diameter: approximately 3.5 μm) at a weight ratio of 4/6, and a film was formed to a basis weight of 12 g/m² by a wet sheeting method and subjected to calender rolling at 130° C., to obtain a nonwoven fabric sheet. The properties of the obtained sheet were as follows.

Average film thickness: 14 μm, gas permeability: 0.60 seconds, normalized puncture strength: 8.9 g/μm (124 g), MacMullin number: 5.0 (MacMullin number×film thickness value=70 μm).

After impregnating and coating this nonwoven fabric sheet with the same dope as prepared in Example 3, the obtained film was immersed in an aqueous solution with a solvent concentration of 40 wt %, coagulated and then washed and dried to obtain a porous film. The properties of the obtained porous film were as follows.

Average film thickness: 24 μm, basis weight: 18.8 g/m², normalized puncture strength: 6.8 g/μm (164 g), MacMullin number: 4.9 (MacMullin number×film thickness value=118 μm), proof stress: 3.3×10² N/m.

The heat deformation temperature, etc. of the separators of Examples 1 to 7 were measured, giving the results shown in Table 1 below.

TABLE 1

|  | Heat deformation temperature | Impregnation | Retention | Gas permeability |
|---|---|---|---|---|
| Example 1 | 240° C. |  |  |  |
| Example 2 | 155° C. |  |  |  |
| Example 3 | 205° C. | 48 wt % | 83 wt % | 22 sec |
| Example 4 | 300° C. | 45 wt % | 78 wt % | 25 sec |
| Example 5 | 280° C. | 47 wt % | 82 wt % | 20 sec |
| Example 6 | 200° C. | 50 wt % | 85 wt % | 30 sec |
| Example 7 | 195° C. | 52 wt % | 88 wt % | 22 sec |

Comparative Example 1

The separator used was a polypropylene (PP) fine porous film (CELGARD TM2400, product of Celgard Co.). The properties of the film were as follows.

Average film thickness: 25 μm, basis weight: 14.8 g/m², gas permeability: 350 seconds, normalized puncture strength: 15.2 g/μm (380 g), MacMullin number: 6.5 (MacMullin number×film thickness value=163 μm).

Comparative Example 2

Crystallized m-aramide short fibers with a thickness of 0.9 dtex (average fiber diameter: approximately 10 μm) and m-aramide fibrit (synthetic pulp particles) were blended in a ratio of 8/2 (weight ratio), and a film was formed to a basis weight of 30 g/m² by a wet sheeting method and subjected to calender rolling at 320° C., to obtain a paper-like sheet. The properties of the obtained sheet were as follows.

Average film thickness: 35 μm, gas permeability: 38 seconds, normalized puncture strength: 16 g/μm (550 g), MacMullin number: 18.0 (MacMullin number×film thickness value=630 μm).

Comparative Example 3

PET was used as the starting material to form a melt blown nonwoven fabric film with an average fiber diameter of 1.5 μm and a basis weight of 35 g/m². The nonwoven fabric was subjected to calender rolling at 130° C. to form a 50 μm film. The properties of the nonwoven fabric were as follows.

Gas permeability: 40 seconds, normalized puncture strength: 5.5 g/μm (275 g), MacMullin number: 3.8 (MacMullin number×film thickness value=190 μm).

After impregnating and coating this nonwoven fabric sheet with the same dope as prepared in Example 3, the obtained film was immersed in an aqueous solution with a solvent concentration of 40 wt %, coagulated and then washed and dried to obtain a porous film. The properties of the obtained porous film were as follows.

Average film thickness: 60 μm, basis weight: 43.5 g/m², normalized puncture strength: 60 g/μm (360 g), MacMullin number: 3.3 (Macmullin number×film thickness value=198 μm).

[Evaluation by Button (Coin) Battery]

EXAMPLE 8

[Positive Electrode]

A positive electrode paste was prepared using an N-methylpyrrolidone (NMP) solution with 6 wt % PVdF, comprising 89.5 parts by weight of lithium cobaltate ($LiCoO_2$, product of Nippon Chemical Industrial Co., Ltd.) powder, 4.5 parts by weight of acetylene black and 6 parts by dry weight of PVdF. The obtained paste was coated and dried onto a 20 μm thick aluminum foil and then pressed to obtain a 97 μm thick positive electrode.

The total lithium content Qp of the positive electrode as calculated from the positive electrode weight was 5.4 mAh/cm².

[Negative Electrode]

A negative electrode paste was prepared using an NMP solution with 6 wt % PVdF, comprising 87 parts by weight of mesophase carbon microbeads (MCMB, product of Osaka Gas Chemical Co., Ltd.) powder as the negative electrode active material, 3 parts by weight of acetylene black and 10 parts by dry weight of PVdF. The obtained paste was coated and dried onto an 18 μm thick copper foil and then pressed to obtain a 90 μm thick negative electrode.

The amount of lithium with which the negative electrode could be doped Qn was 2.6 mAh/cm², as measured with a three electrode battery.

[Fabrication of Button (Coin) Batteries]

The above-mentioned positive electrode and negative electrode were punched out into a 14 mm diameter circle, and the separators fabricated in Examples 1 to 7 were used after punching out to a 16 mm diameter. The positive and negative electrodes were joined via each of the separators, impregnated with an electrolyte (electrolyte solution) and encapsulated into battery cases. The electrolyte solution used was 1 M $LiPF_6$ EC/DEC (1/1 weight ratio). The battery case size was CR2032.

[Overcharge Evaluation]

The overcharge evaluation of each of the fabricated button batteries was carried out by measurement of one charge/discharge cycle under conditions with constant current/constant voltage charging for 8 hours at a charging current density of 0.52 mA/cm², charging voltage upto 4.2 V and constant current discharge at a discharging current density of 0.52 mA/cm² and a 2.75 V cutoff, after which overcharging was carried out under conditions with constant current charging for 10 hours at a charging current density of 2.6 mA/cm². After standing for 2 hours following the overcharging, discharge was carried out under conditions with a discharging current density of 0.52 mA/cm² and a 2.75 V cutoff. The battery voltage sampling time was every 30 seconds.

Battery voltage oscillation was observed during charging with all of the batteries, and the battery voltage never increased above 5.5 V during charging. Also, all of the batteries had an open circuit voltage in the range of 4.2–4.5 V after overcharging, and were thus capable of discharge after overcharging.

Figure 2:
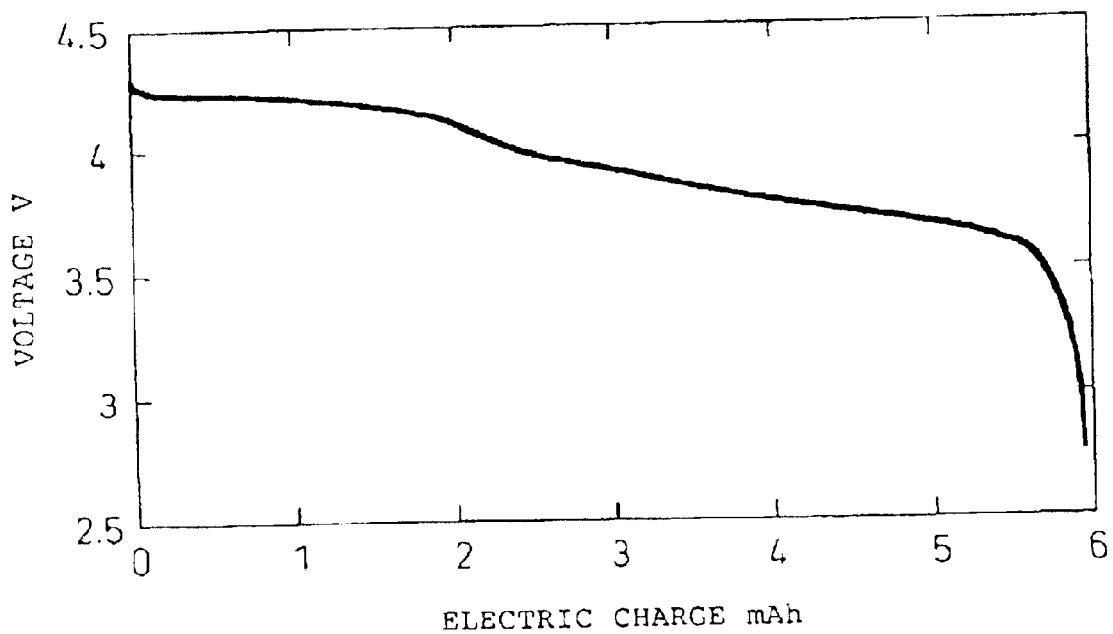
FIG. 2 is a graph showing discharge behavior after overcharging for Example 8.

Table 2 shows the electric charge (Q1) at the start of battery voltage oscillation and the discharge capacity Qd obtained after overcharging. FIG. 1 shows the change in voltage during overcharging and FIG. 2 shows the discharge behavior after overcharging, for a battery employing the separator of Example 7, as one example.

Comparative Example 4

Button batteries were fabricated using the separators of Comparative Examples 1 to 3, by the same method as Example 8. The button batteries were subjected to testing in the same manner as Example 8.

The battery employing the separator of Comparative Example 2 did not exhibit adequate properties in the first charge/discharge cycle, as a result of the high resistance of the separator. Therefore, no overcharging test was conducted for the battery employing the separator of Comparative Example 2.

The batteries employing the separators of Comparative Examples 1 and 3 exhibited satisfactory first charge/discharge, and were therefore subjected to an overcharging test. However, no battery voltage oscillation was observed, and the battery voltage increased above 5.5 V making further discharge impossible. FIG. 1 shows the change in voltage during overcharging for the battery employing the separator of Comparative Example 1.

These results demonstrate that the batteries employing the separators of Comparative Examples 1 and 3 clearly exhibit no overcharge-preventing functions as were exhibited by the lithium ion secondary batteries of the invention.

EXAMPLE 9

Button batteries were fabricated with the separators of Examples 1 to 7, by the same method as Example 8, but using a copper foil as the negative electrode. The button batteries were subjected to constant current charging at a charging current density of 0.56 mA/cm$^2$, with the copper foil as the negative electrode. With all of the batteries there was observed a battery voltage drop, a battery voltage oscillation or a general halt in battery voltage increase.

Table 2 shows the electric charge Q2 at the start of this phenomenon.

EXAMPLE 10

Button batteries were fabricated with the separators of Examples 1 to 7, by the same method as Example 8. The button batteries were subjected to an overcharging test under the same conditions as Example 8. During the overcharging test, the impedance $R_{0.5}$ at 1 kHz was measured when the Qc reached 1.3 mAh/cm$^2$. Also, the impedance R2 at 1 kHz was measured when the Qc reached 5.4 mAh/cm$^2$.

Table 2 shows the values for $R_2/R_{0.5}$.

EXAMPLE 11

Figure 3:
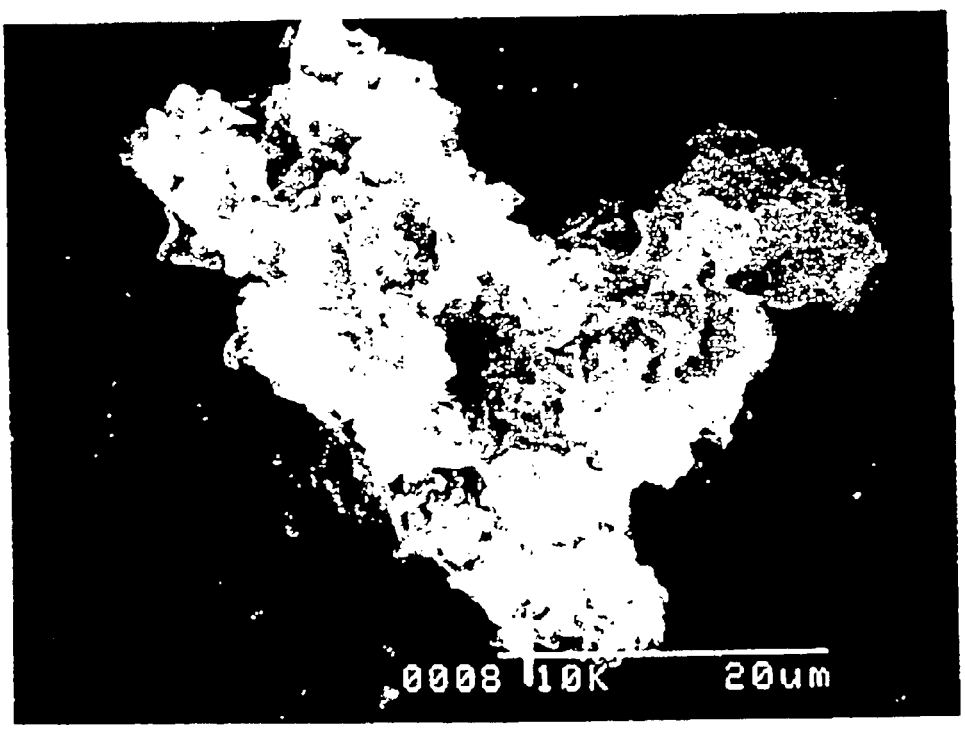
FIG. 3 is an electron micrograph showing the shape of lithium particles produced on a negative electrode during overcharging.

Button batteries were fabricated with the separators of Examples 1 to 7, by the same method as Example 8. The button batteries were subjected to an overcharging test under the same conditions as Example 8. When the Qc in the overcharging test reached 7 mAh/cm$^2$, overcharging was halted, the battery was taken apart and the negative electrode surface was observed with a scanning electron microscope (SEM). FIG. 3 shows a SEM photograph of the separator used in Example 5, but the same interspersion of lithium particles with a maximum length of 100 μm was observed in all of the batteries.

With the separators of Examples 3 to 7, surface pores corresponding to these lithium particles were observed on the side in contact with the negative electrode, and no surface pores were observed on the side in contact with the positive electrode.

The results for Examples 8 to 11 demonstrate that the lithium ion secondary batteries of the invention employing lithium ion secondary battery separators according to the invention exhibit an overcharge-preventing function by the lithium particles, as explained above.

[Evaluation of Film-cased Battery]

EXAMPLE 12

The positive electrode and negative electrode fabricated in Example 8 were used, with equal areas, for fabrication of a film-sheathed battery using the separator of Example 5. The film-sheathed battery was fabricated by connecting the positive electrode and negative electrode via the separator, placing the combination in an aluminum-plastic laminated pack, and injecting an electrolyte solution. The electrolyte solution used for this film-cased battery was prepared by dissolving LiPF$_6$ to 1 M in a mixed solvent having a composition of EC:DEC:MEC=1:1:1 (weight ratio). The size of the film-cased battery was 55 mm×35 mm×3.7 mm.

Upon measurement of the initial charge/discharge in the same manner as Example 8, the film-cased battery was found to have a capacity of 650 mAh.

Figure 4:
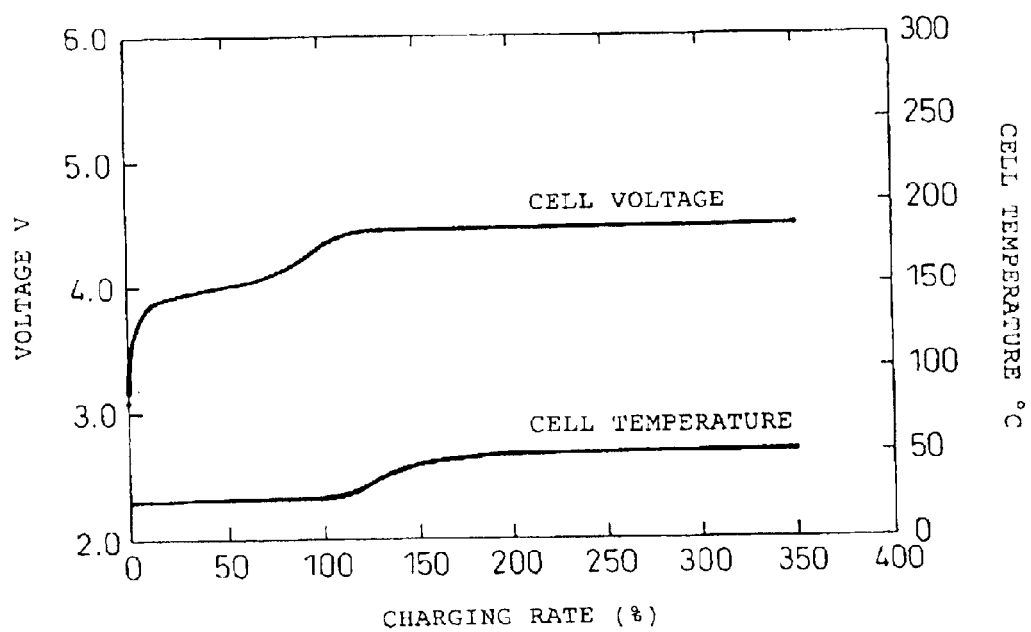
FIG. 4 is a graph showing the change in voltage and change in battery surface temperature during overcharging for Example 12.

The film-cased battery was overcharged by constant current charging to a Qc of 1950 mAh (350% charging percentage) at a charging current density of 2.6 mA/cm$^2$, at an environment temperature of 25° C. The battery voltage increase generally halted at a 120% charging percentage, leveling off at about 4.5–4.6 V. The battery surface temperature began to rise simultaneously with the general halt in the battery voltage increase, leveling off at about 50° C., with a maximum battery surface temperature of 51° C. (FIG. 4). No swelling of the film-cased battery was observed during this overcharging. The charging percentage referred to here is the percentage of the time elapsed for the charging procedure with respect to the time required for full charging.

After the overcharging, constant current discharge was carried out to 2.75 V at a discharging current density of 0.52 MA/cm$^2$. A discharge capacity of 656 mAh was obtained.

These results demonstrate that the overcharge-preventing function of the lithium ion secondary battery of the invention can be effectively achieved even with a practical battery size.

EXAMPLE 13

A film-cased battery having the same construction as the film-cased battery fabricated in Example 12 was overcharged to a 186% charging percentage at a charging current density of 2.6 mA/cm$^2$, and the battery was subjected to an oven heating test. The temperature elevating rate in the oven was 5° C./min, and the battery was allowed to stand for one hour when the temperature reached 150° C. As a result, no rupture or fire occurred, despite swelling of the battery.

Comparative Example 5

A film-cased battery was fabricated in the same manner as Example 12, except for using the separator of Comparative Example 1, and this was overcharged to a 186% charging percentage at a charging current density of 2.6 mA/cm², after which the battery was subjected to an oven heating test under the same conditions as Example 13. The battery ruptured and fired when the oven temperature reached 125° C.

EXAMPLE 14

A film-cased battery was fabricated having the same construction as the film-cased battery fabricated in Example 12. This film-cased battery was subjected to 5 cycles of an overcharging cycle test of charging to a Qc of 1300 mAh with a charging current density of 2.6 mA/cm² and constant current discharging to 2.75 V at 0.52 mA/cm². No swelling, rupture or fire of the battery occurred during the test, and a discharge capacity of 448 mAh was obtained even after the 5th cycle.

The results of Examples 13 and 14 and Comparative Example 5 demonstrate that the lithium ion secondary battery of the invention is highly safe against overcharging compared to conventional lithium ion secondary batteries.

EXAMPLE 15

A film-cased battery was fabricated having the same construction as the film-cased battery fabricated in Example 12, and a chalk marker (thermo label) for detection of heat generation was attached to the surface of the film-cased battery. The battery was subjected to overcharging to a Qc of 900 mAh at a charging current of 2.6 mA/cm². The attached chalk marker exhibited a color change.

Comparative Example 6

A film-cased battery was fabricated having the same construction as the film-cased battery fabricated in Comparative Example 5, and a chalk marker for detection of heat generation was attached to the surface of the film-cased battery. The battery was subjected to overcharging to an electric charge of 900 mAh at a charging current density of 2.6 mA/cm². The attached chalk marker exhibited no color change.

When the overcharge-preventing function was exhibited in the battery of Example 15, the electrical energy introduced into the battery by the procedure of charging was discharged out of the system as Joule's heat without being stored in the battery, and therefore the chalk marker changed color. In contrast, with the battery of Comparative Example 6, all of the electrical energy introduced into the battery by charging was stored in the battery with no heat generation, and therefore the chalk marker did not change color.

The results for Example 15 and Comparative Example 6 demonstrate that the lithium ion secondary battery of the invention has the advantage of allowing effective use of thermistor-type overcharge protection circuits, which have not been possible with conventional lithium ion secondary batteries.

TABLE 2

|  | Q1 (mAh/cm²) | Qd (mAh/cm²) | Q2 (mAh/cm²) | $R_2/R_{0.5}$ |
| --- | --- | --- | --- | --- |
| Example 1 | 2.69 | 2.68 | 0.01 | 1.03 |
| Example 2 | 3.75 | 3.12 | 0.90 | 1.05 |
| Example 3 | 3.06 | 2.86 | 0.34 | 1.07 |
| Example 4 | 2.89 | 3.17 | 0.25 | 1.05 |
| Example 5 | 3.11 | 2.89 | 0.32 | 1.05 |
| Example 6 | 3.25 | 2.90 | 0.50 | 1.05 |
| Example 7 | 4.27 | 3.86 | 1.56 | 1.10 |

Industrial Applicability

According to the present invention, it is possible to prevent overcharging in a lithium ion secondary battery by doping the positive electrode with lithium from the lithium particles produced on the negative electrode during overcharge, and thus provide a lithium ion secondary battery which is safe during overcharge.

What is claimed is:

1. A lithium ion secondary battery comprising a positive electrode, a negative electrode, a separator and a non-aqueous electrolyte, wherein 1) the separator is composed essentially of a porous sheet, 2) the positive electrode active material and the negative electrode active material can be reversibly doped and dedoped such that, where Qp (mAh) is an electric charge necessary for causing total lithium contained in the positive electrode to be dedoped and Qn (mAh) is an electric charge necessary for causing lithium to fully dope the negative electrode, Qp>Qn, and 3) when the battery is charged at a charging current Ic (mA) in a range of 0.2 Qn/h<Ic<2 Qn/h, in a range of an electric charge for charging Qc (mAh) of 1<Qc/Qn<Qp/Qn, doping of the positive electrode by lithium is started through lithium particles produced on the negative electrode by charging of the battery and is continued up to Qc>Qp.

2. A battery according to claim 1 wherein, upon charging with a charging current Ic (mA) satisfying the condition 0.2 Qn/h<Ic<2 Qn/h, the Qc (mAh) at which a battery voltage drops, a battery voltage oscillation or a general halt in battery voltage increase occurs, is in the range of 1<Qc/Qn<Qp/Qn.

3. A battery according to claim 1 wherein, upon charging with a charging current Ic (mA) satisfying the condition 0.2 Qn/h<Ic<2 Qn/h, battery voltage oscillation of 10 mV or greater starts and continues to Qc>Qp, when the Qc (mAh) is in the range of 1<Qc/Qn<Qp/Qn.

4. A battery according to claim 1 wherein, when the battery is charged at a charging current Ic (mA) which satisfies 0.2 Qn/h<Ic<2 Qn/h to a Qc (mAh) such that 2<Qc/Qn<3 and then discharged at a discharging current Id (mA) such that 0.1 Qn/h<Id<0.5 Qn/h, the discharge capacity Qd (mAh) is in the range of 1<Qd/Qn<Qp/Qn.

5. A battery according to claim 1 wherein, when charging with a charging current Ic (mA) satisfying 0.2 Qn/h<Ic<2 Qn/h, the battery voltage is no greater than 5.5 V in the total range where the Qc (mAh) is such that 1<Qc/Qn<1.5 Qp/Qn.

6. A battery according to claim 1, wherein the relationship between the battery internal resistance $R_{0.5}$ at 1 kHz when the Qc (mAh) satisfies Qc/Qn=0.5 and the battery internal resistance $R_2$ at 1 kHz when Qc=Qp, is $1.5R_{0.5}>R_2$.

7. A battery according to claim 1 wherein, for a Qc (mAh) in the range of Qp<Qc<1.5 Qp, the maximum length of the lithium particles produced on the negative electrode by charging of the battery is 100 μm or smaller.

8. A battery according to any one of claims 1 to 7, wherein the separator either comprises a sheet (A) with an average film thickness of 10–35 μm, a weight of 6–20 g/M², a gas permeability (JIS P8117) of no longer than 100 seconds, a MacMullin number of 10 or smaller at 25° C. and a MacMullin number×average film thickness value of no greater than 200 μm, or else comprises a porous film with an average film thickness of 10–35 μm and a basis weight of 10–25 g/M², which contains a porous organic polymer film (B) that surrounds said sheet (A) and is swellable with the electrolyte solution and is retainable.

9. A battery according to claim 8, wherein the sheet (A) is composed of fibers and the average diameter of the fibers composing the sheet is ½ to ¹⁄₁₀ of the average film thickness of the sheet (A).

10. A battery according to claim 9, wherein the sheet (A) is a nonwoven fabric.

11. A battery according to claim 8, wherein the sheet (A) is composed of a polyester, aromatic polyamide, polyphenylene sulfide or polyolefin or a combination of two or more thereof.

12. A battery according to claim 8, wherein the porous organic polymer film (B) is composed mainly of polyvinylidene fluoride (PVdF).

13. A battery according to claim 12, wherein the porous organic polymer film (B) is composed of a polyvinylidene fluoride copolymer containing 92–98% mole percent of vinylidene fluoride (VdF).

14. A battery according to claim 13, wherein the porous organic polymer film (B) is composed of a terpolymer of vinylidene fluoride, hexafluoropropylene (HFP) and chlorotrifluoroethylene (CTFE).

15. A battery according to claim 14, wherein the copolymer composition of the terpolymer is VdF/HFP(a)/CTFE(b), where (a)=2–8 wt % and (b)=1–6 20 wt %.

16. A battery according to claim 8 which has a film case.

17. A lithium ion secondary battery pack equipped with a lithium ion secondary battery according to claim 8, and a heat-sensitive sensor or heat-sensitive switch.

18. A method for charging a lithium ion secondary battery according to claim 8, the method comprising charging said lithium ion secondary battery by a constant current charging method, and determining completion of charging based on at least one of the following: battery temperature increase, battery voltage drop or battery voltage oscillation.

19. An electric or electronic device comprising a lithium ion secondary battery according to claim 8.

20. An electric or electronic device comprising a lithium ion secondary battery pack according to claim 17.

* * * * *